United States Patent Office 2,978,461
Patented Apr. 4, 1961

2,978,461

PROCESS OF PRODUCING PHENYLALKYL-HYDRAZINES

John H. Biel, Milwaukee, Wis., assignor, by mesne assignments, to Lakeside Laboratories, Inc., Milwaukee, Wis., a corporation of Delaware No Drawing. Filed Nov. 21, 1958, Ser. No. 775,360

7 Claims. (Cl. 260—340.5)

This invention relates to the production of phenylalkylhydrazines. More particularly, this invention is concerned with a novel process of producing phenylalkylhydrazines.

This application is a continuation-in-part of Serial No. 605,724 filed Augst 23, 1956, now abandoned, Serial No. 716,876 filed February 24, 1958, and Serial No. 716,877 filed February 24, 1958, now abandoned, wherein it is shown that phenylalkylhydrazones may be reduced by chemical or catalytic means to the corresponding phenylalkylhydrazines. While the conventional reduction methods lead to the desired product, low yields are ordinarily obtained due to the formation of large amounts of undesirable by-products. This may be illustrated by the reduction of 1-phenyl-2-propyl hydrozone (I) to 1-phenyl-2-propyl hydrazine (III) according to the following scheme:

PhCH$_2$C=N—NH$_2$    [H]    →    { [PhCH$_2$C(CH$_3$)=N—]$_2$ (II) by-product<br>
    |<br>
  CH$_3$<br>
I
     PhCH$_2$CH(CH$_3$)NH—NH$_2$ (III) desired compound<br>
     [PhCH$_2$CH(CH$_3$)—NH]$_2$ (IV) by-product.<br>
     PhCH$_2$CH(CH$_3$)—NH$_2$ (V) by-product It has been found that large amounts of II also occur, besides the desired product, when the reduction proceeds slowly and incompletely with catalysts such as palladium, rhodium, ruthenium and platinum oxide in solvents such as alcohol, tetrahydrofuran, water, ethyl acetate and dioxan. Product IV is obtained in large amounts when the hydrogenation proceeds to completion slowly as with platinum oxide in aqueous acetic acid. Products II and V form during Raney nickel reduction of the hydrazone in ethanol. In addition, higher temperatures than 80° C., regardless of the catalyst used, give large amounts of V. Furthermore, chemical reduction also gives considerable amounts of by-products, and particularly IV.

According to the subject invention, the reduction of phenylalkylhydrazones of the formula

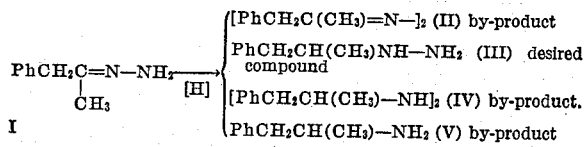

to the corresponding phenylalkylhydrazines of the formula

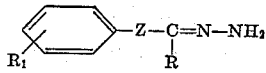

may be readily effected by hydrogen using platinum or platinum oxide as the catalyst in a lower alcohol as solvent and in the presence of added glacial acetic acid, wherein Z represents a bond or a straight or branched lower alkylene group, R represents hydrogen or a lower alkyl group, provided however that Z is only a branched alkylene when R is hydrogen and that R is only a lower alkyl group when Z is a bond, and R$_1$ is hydrogen or one or more substituents on the phenyl group such as a lower alkyl group like the methyl, ethyl, propyl and butyl groups, a lower alkoxy group such as the methoxy, ethoxy and propoxy groups, an aryl group such as the phenyl group, an aralkyl group and particularly a phenyl-lower alkyl group such as the benzyl group, a phenyl-lower alkoxy group such as phenylmethoxy and including the phenoxy group, the hydroxy group, polyalkoxy substituents such as dimethoxy and trimethoxy substituents, a lower alkylenedioxy group such as the methylenedioxy group, a halogen such as bromine or chlorine, and a dihydroxy group. The reduction is particularly useful where

contains 5 carbons or less.

Some of the phenylalkylhydrazones which may be reduced according to this process are phenyl-2-propylidenyl hydrazine, N-(3-phenyl-2-propylidenyl)hydrazine, N-[3-(3,4-methylenedioxyphenyl)-2-propylidenyl]hydrazine, 6-phenyl-2-hexylidenyl hydrazine, 4-(p-chlorophenyl)-3-butylidenyl hydrazine, 4-(p-hydroxyphenyl)-2-butylidenyl hydrazine, and 1-phenyl-1-methyl-methylidenyl hydrazine.

Platinum and platinum oxide may be employed in the process in a finely divided state. In addition, these catalysts may also be used satisfactorily on suitable catalyst carriers.

Although any of the lower alkanols may be employed as the solvent, including methanol, ethanol, isopropanol, and t-butanol, the solvent advisably employed is ethanol. Denatured ethanol is also satisfactory for the reaction medium. The presence of water is undesirable and should be avoided.

The hydrogen pressure for the reduction is not critical. For small batches, such as 0.50 mole, pressures of about 60 p.s.i. are satisfactory. In large-scale manufacture, however, it is advisable to use pressures of about 1,500 to 3000 p.s.i.

Hydrogenation temperatures above 80° C. are advisably not employed since higher temperatures favor cleavage of the hydrazine N—N linkage to form compound V. In general, from room temperature (20° C.) to about 50° C. is preferred for the hydrogenation.

The amount of glacial acetic acid included in the solvent medium is not narrowly critical although sufficient acetic acid should be added to react with all of the hydrazone to be reduced. Thus, advisably at least one mole of glacial acetic acid should be added for each mole of phenylalkyl hydrazone to be reduced.

The hydrogenation is terminated when hydrogen uptake has substantially ceased. The reaction mixture is then filtered to remove the catalyst and the filtrate heated to remove the solvent and acetic acid. After making the residue strongly alkaline, as with solid potassium hydroxide, the desired product may be extracted with ether and recovered by fractional distillation.

By following the procedure of this invention the desired product is obtained in yields of 55% to 70% although from 30% to 45% yields of by-products II and IV are still obtained.

Some of the phenylalkylhydrazines which may be produced according to this process by reduction of the corresponding phenylalkylhydrazones are 1-phenyl-2-propyl hydrazine, 2-phenyl-3-propyl hydrazine, 1-(3,4-methylenedioxyphenyl)-2-propyl hydrazine, 1,(p-chlorophenyl)-1-ethyl hydrazine, 1-phenyl-3-butyl hydrazine and 1-phenyl-4-hexyl hydrazine.

The following examples are presented to illustrate the invention.

EXAMPLE 1

*1-phenyl-2-propyl hydrazine*

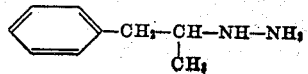

A solution containing 741 g. (5.0 mole) of 1-phenyl-2-propyl idenylhydrazine, 300 g. (5.0 mole) of glacial acetic acid and 900 cc. of absolute ethanol was subjected to hydrogenation at 1,875 p.s.i. of hydrogen in the presence of 10 g. of platinum oxide catalyst and at a temperature of 30°–50° C. (variation due to exothermic reaction). The catalyst was removed by filtration and the solvent and acetic acid were distilled. The residue was taken up in water and made strongly alkaline by the addition of solid potassium hydroxide. The alkaline mixture was extracted with ether and the ether extracts dried with potassium carbonate. The product was collected by fractional distillation, B.P. 85° C. (0.30 mm.); yield 512 g. (68%). $N_D^{20}$ 1.5375.

Analysis.—Calcd. for $C_9H_{14}N_2$: N, 18.66. Found: N, 18.74.

The hydrochloride salt was formed in a mixture of 1 : 10 isopropyl alcohol : diisopropyl ether and recrystallized from acetonitrile, yield 87%, M.P. 124–125° C.

Analysis.—Calcd. for $C_9H_{15}ClN_2$: Cl, 18.99; N, 15.01. Found: Cl, 19.00; N, 15.16.

EXAMPLE 2

*2-phenyl-3-propyl hydrazine*

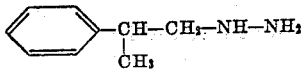

2-phenyl-3-propylidenyl hydrazine was reduced by dissolving 59.3 g. (0.40 mole) of it in 200 cc. of ethanol, and neutralizing the solution with 24 g. of acetic acid and subjecting it to hydrogenation at 60 p.s.i. of hydrogen in the presence of 0.8 g. of platinum oxide and starting at room temperature. The mixture increased in temperature slightly during the hydrogenation. The product was collected by distillation in vacuo, B.P. 70° C. (0.1 mm.); $N_D^{20}$ 1.5417.

Analysis.—Calcd. for $C_9N_{14}N_2$: N, 18.65. Found: N, 17.57.

EXAMPLE 3

*Alpha-ethylbenzyl hydrazine*

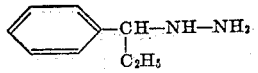

Propiophenone hydrazone was reduced with platinum oxide in ethanol containing a molar equivalent of glacial acetic acid according to the procedure of Example 2.

EXAMPLE 4

*1-(3,4-methylenedioxyphenyl)-2-propyl hydrazine*

1-(3,4-methylenedioxyphenyl)-2-propylidenyl hydrazine was reduced in ethanol containing a molar equivalent of glacial acetic acid with platinum oxide with hydrogen at 60 p.s.i. and starting at room temperature as in Example 2.

EXAMPLE 5

*1-phenyl-2-propyl hydrazine*

The procedure of Example 1 was repeated using isopropanol in place of ethanol and a yield of about 60% obtained.

Various changes and modifications of the invention can be made and, to the extent that such variations incorporate the spirit of this invention, they are intended to be included within the scope of the appended claims.

What is claimed is:
1. The process which comprises reducing a compound of the formula

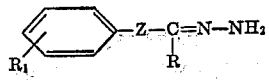

in a dry lower alkanol containing at least a molar equivalent of acetic acid per amount of hydrazone present with hydrogen using as a catalyst a member of the group consisting of platinum and platinum oxide at a temperature from 20° C. to 80° C. to produce a compound of the formula

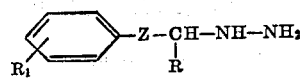

wherein Z is a member of the group consisting of a single chemical bond and straight and branched lower alkylene groups, R is a member of the group consisting of hydrogen and lower alkyl groups, and Z is only a branched alkylene when R is hydrogen and R is only a lower alkyl group when Z is a chemical bond, and $R_1$ is a member of the group consisting of hydrogen and nuclear substituents on the phenyl group.

2. The process of claim 1 in which the hydrogenation is carried out in ethanol.

3. The process which comprises reducing 1-phenyl-2-propyl hydrazone with hydrogen using a catalyst of the group consisting of platinum and platinum oxide in a lower alkanol containing acetic acid in an amount at least molecularly equivalent to the hydrazone present at a temperature from 20° C. to 80° C. to produce 1-phenyl-2-propyl hydrazine.

4. The process which comprises reducing 2-phenyl-3-propylidenyl hydrazine with hydrogen using a catalyst of the group consisting of platinum and platinum oxide in a lower alkanol containing acetic acid in an amount at least molecularly equivalent to the hydrazone present at a temperature from 20° C. to 80° C. to produce 2-phenyl-3-propyl hydrazine.

5. The process which comprises reducing propiophenone hydrazone with hydrogen using a catalyst of the group consisting of platinum and platinum oxide in a lower alkanol containing acetic acid in an amount at least molecularly equivalent to the hydrazone present at a temperature from 20° C. to 80° C. to produce alpha-ethyl benzyl hydrazine.

6. The process which comprises reducing 1-(3,4-methylenedioxyphenyl)-2-propylidenyl hydrazine with hydrogen using a catalyst of the group consisting of platinum and platinum oxide in a lower alkanol containing acetic acid in an amount at least molecularly equivalent to the hydrazone present at a temperature from 20° C. to 80° C. to produce 1-(3,4-methylenedioxyphenyl)-2-propyl hydrazine.

7. The process of claim 3 in which the alkanol is ethanol.

References Cited in the file of this patent

Taipale: "Berichte Deut. Chem.," vol. 56, pages 954–962 (1923).

Taipale: "Chemical Abstracts," vol. 17, pages 3015–3016 (1923).

Klages et al.: "Annalen der Chemie," vol. 547, p. 8 (1941).